United States Patent [19]
Komatsu et al.

[11] Patent Number: 5,029,250
[45] Date of Patent: Jul. 2, 1991

[54] PATTERN CONFIGURATION MEASURING APPARATUS

[75] Inventors: Fumio Komatsu, Fuchu; Motosuke Miyoshi, Tokyo, both of Japan

[73] Assignee: Kabushiki Kaisha Toshiba, Kawasaki, Japan

[21] Appl. No.: 363,275

[22] Filed: Jun. 8, 1989

[30] Foreign Application Priority Data

Jun. 8, 1988 [JP] Japan ................................. 63-140775

[51] Int. Cl.$^5$ ..................... G01N 23/225; H01J 37/28
[52] U.S. Cl. .................................... 250/310; 250/307
[58] Field of Search ............................... 250/307, 310

[56] References Cited

U.S. PATENT DOCUMENTS 4,567,364 1/1986 Kano et al. .......................... 250/307
4,725,730 2/1988 Kato et al. .......................... 250/307

OTHER PUBLICATIONS

Finnes, S. J. et al., "Nondestructive Slope/Thickness Measurement for Semiconductor Topology", IBM Technical Disclosure Bulletin, vol. 26, No. 1, Jun. 1983, pp. 189-190.
Suganuma, Tadao, "Measurement of Surface Topography Using SEM with Two Secondary Electron Detectors", 2339 Journal of Electron Microscopy, 34(1985), No. 4, Tokyo, Japan, pp. 328-337.
Hearle, J. W. S. et al., "The Use of the Scanning Electron Microscope", Pergamon Press Ltd., 1982, p. 65.

Primary Examiner—Jack I. Berman
Attorney, Agent, or Firm—Foley & Lardner

[57] ABSTRACT

A pattern configuration measuring method of and apparatus for measuring a cross sectional profile of a pattern (10) formed on a flat plane with a concave or convex structure having a taper portion (10a, 10b) on both sides thereof, by scanning a beam in a predetermined direction with a scanning electron microscope (1), detecting a secondary electron to acquire an image signal of the pattern, and processing the image signal. The column (1a) of the scanning electron microscope is set at an optional inclination angle relative to the flat plane formed with the pattern, a beam is scanned onto the pattern with the scanning electron microscope in the direction perpendicular to the longitudinal direction of the concave or convex structure, an output signal is acquired from the scanning electron microscope and image-processed to detect both the taper portions of the pattern and to calculate the dimension of the pattern, a beam is scanned onto the pattern with the scanning electron microscope in the direction parallel to the longitudinal direction of the concave or convex structure, and an output signal is acquired from the scanning electron microscope and image-processed to calculate the cross sectional profile of the pattern. The column of the scanning electron microscope may be set perpendicular to the flat plane, and the pattern to be measured is set at an optional inclination angle relative to the column axis of the scanning electron microscope.

6 Claims, 4 Drawing Sheets

PATTERN CONFIGURATION MEASURING APPARATUS

BACKGROUND OF THE INVENTION

The present invention relates to a pattern configuration measuring apparatus for measuring a three dimensional configuration, of an LSI fine pattern, such as a pattern taper angle, film thickness (depth), cross sectional profile, pattern dimension and the like.

As a technique for measuring a three dimensional configuration of a fine pattern by using a scanning electron microscope (hereinafter called a SEM), a cross section observing method heretofore widely used is known whereby a specimen is cut away to observe its cross sectional profile.

A system is also known wherein images are taken with a SEM at different stage tilting angles, and manual matching of corresponding positions of the images is carried out for calculation of a three dimensional configuration (refer to Y. Kato et al.: "Stereoscopic Observation and Three Dimensional Measurement for Scanning Electron Microscopy" IITRI/SEM/1977, pp. 41 to 48, and Hama et al.: "Determination of Three Dimensional Image Information Based on A Stereoscopic Photograph Taken with Ultra High Voltage Electron Microscope" Electron Microscopy, Vol. 20, No. 2, 1985, pp. 134 to 142).

A system is also known wherein signals detected with two detectors disposed symmetrically relative to the center of a beam radiated position are processed and integrated for calculation of a three dimensional configuration (refer to T. Suganuma: "Measurement of Surface Topography Using SEM with Two Secondary Electron Detectors" J. Electron Microscopy., Vol. 34, No. 4, pp. 328 to 337, 1985).

Although the cross section observing method is widely used, the specimen once cut-away cannot be used again. In addition, the pattern to be measured is limited to the cross sectional pattern at the cut-away plane. There is also for an associated problem that the cross sectional pattern of a fine hole having a diameter of, e.g., 2 microns or smaller, it becomes difficult to obtain a correct image of an actual pattern unless the cut-away plane is made perpendicular to the substrate surface.

The method whereby a stereoscopic configuration is calculated by obtaining corresponding points of images taken with an SEM at different stage tilting angles has been widely used in the field of remote sensing. With this method, obtaining the corresponding points, i.e., manually performing so-called pattern matching, takes a considerably long time. On the other hand, automatically performing pattern matching may cause matching errors which are not negligible depending upon the configuration of a fine pattern, resulting in a large measurement error.

For processing signals from two detectors disposed symmetrically relative to the center of a beam radiated position, it is necessary to balance beforehand the signals from both the detectors. In addition, it is necessary to vapor-deposit Au beforehand on a specimen because a high S/N ratio is required. Furthermore, if a pattern to be measured is isolated from other patterns, a good stereoscopic configuration can be obtained, however if adjacent patterns are spaced by 2 microns or less, the resultant stereoscopic configuration is influenced by the adjacent patterns and becomes different from the actual configuration.

SUMMARY OF THE INVENTION

The present invention has been made in consideration of the above problems. It is an object of the present invention to provide a pattern configuration measuring method and apparatus capable of measuring a pattern configuration correctly at high speed in a non-destructive and non-contact manner.

In order to achieve the above object, the present invention provides:

a pattern configuration measuring method for measuring a cross sectional profile of a pattern formed on a flat plane with a concave or convex structure having a taper portion on both sides thereof, by scanning a beam in a predetermined direction with a scanning electron microscope, detecting secondary electrons to acquire an image signal of the pattern, and processing the image signal, comprising the steps of:

setting the column of the scanning electron microscope at an optional inclination angle relative to said flat plane formed with said pattern;

scanning a beam onto the pattern with said scanning electron microscope in the direction perpendicular to the longitudinal direction of the concave or convex structure;

acquiring an output signal from the scanning electron microscope and image processing the output signal to detect both of the taper portions of the pattern and to calculate dimension of the pattern;

scanning a beam onto said pattern with the scanning electron microscope in the direction parallel to the longitudinal direction of the concave or convex structure; and acquiring an output signal from the scanning electron microscope and image processing the output signal to calculate the cross sectional profile of the pattern.

The present invention also provides a pattern measuring apparatus for measuring a cross sectional profile of a pattern formed on a flat plane with a concave or convex structure having a taper portion on both sides thereof, by scanning a beam in a predetermined direction with a scanning electron microscope, detecting secondary electrons to acquire an image signal of the pattern, and processing the image signal, comprising:

a rotative stage for mounting the pattern to be measured, and a scanning electron microscope mountable at an optional inclination angle relative to the stage and having a column;

an image processing unit for obtaining and image processing an output signal from the scanning electron microscope upon scanning a beam with the scanning electron microscope; and a unit for calculating the dimension of opposite ends of the bottom of said pattern in accordance with an output from the image processing unit in the case where the beam scan direction of the scanning electron microscope is perpendicular to the longitudinal direction of the pattern, and in the case where the beam scan direction of the scanning electron microscope is parallel to the longitudinal direction of the pattern, calculating the cross sectional profile of the pattern in accordance with an output from the image processing unit.

DETAILED DESCRIPTION OF THE PREFERRED EMBODIMENT

Figure 1:
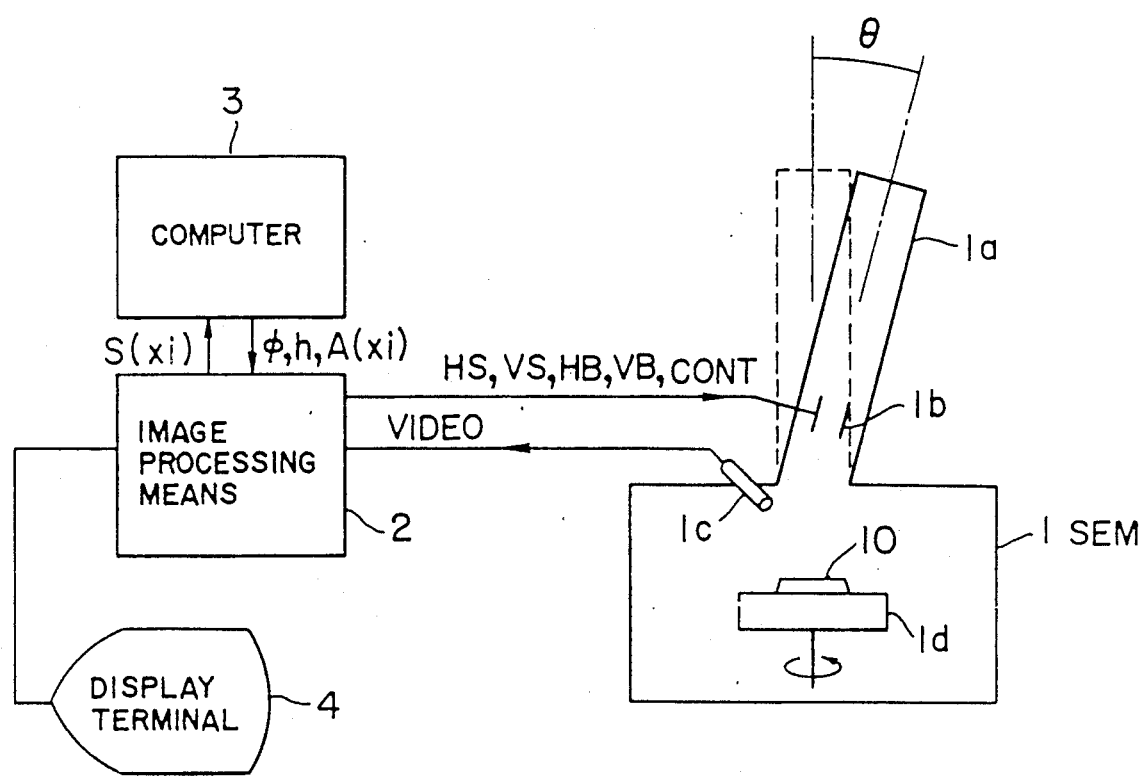
FIG. 1 is a schematic diagram showing an embodiment of a pattern configuration measuring apparatus according to the present invention.

An embodiment of the pattern configuration measuring apparatus of this invention is shown in FIG. 1. The apparatus of this embodiment comprises a scanning electron microscope (SEM) 1, an image processing unit 2, computer 3, and display terminal 4. The SEM 1 comprises a column 1a, deflector 1b, detector 1c, and stage 1d.

The image processing unit 2 performs an image processing function as described, for example, in U.S. patent application Ser. No. 257,557 and EP No. 88117110.2, and the computer 3 performs a pattern measuring function as described, for example, in U.S. patent application Ser. No. 257,862 and EP No. 88117111.0.

Figure 2:
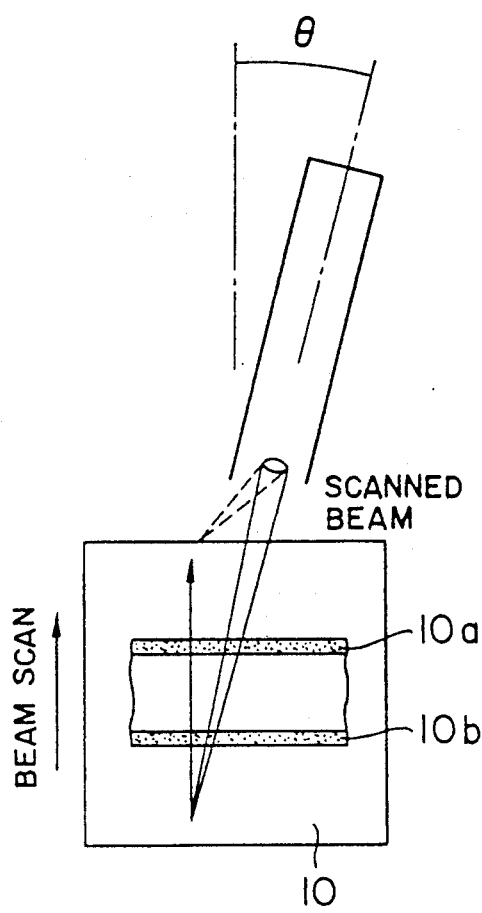
FIG. 2 shows an example of observation of a pattern measured under the condition that the column inclination plane is made parallel to the longitudinal direction of the taper portion of the pattern to be measured.
Figure 3:
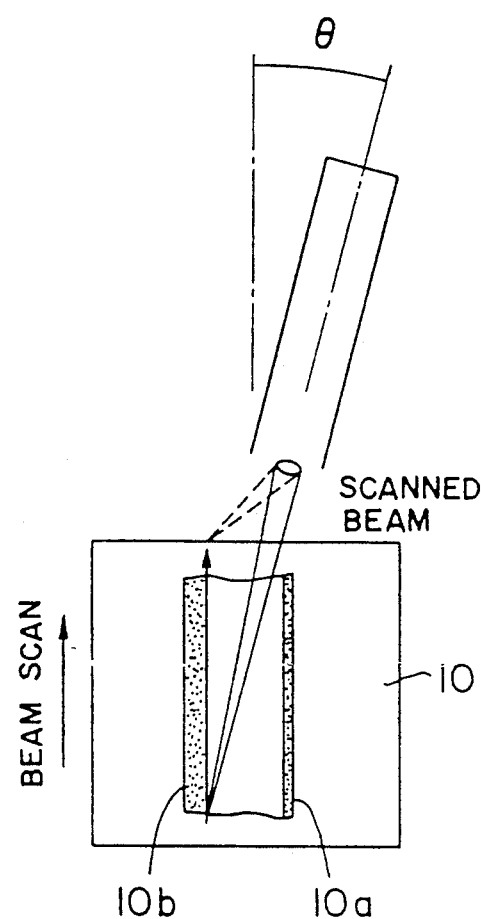
FIG. 3 shows an example of observation of a pattern measured under the condition that the column inclination plane is made perpendicular to the longitudinal direction of the taper portion of the pattern to be measured.
Figure 4:
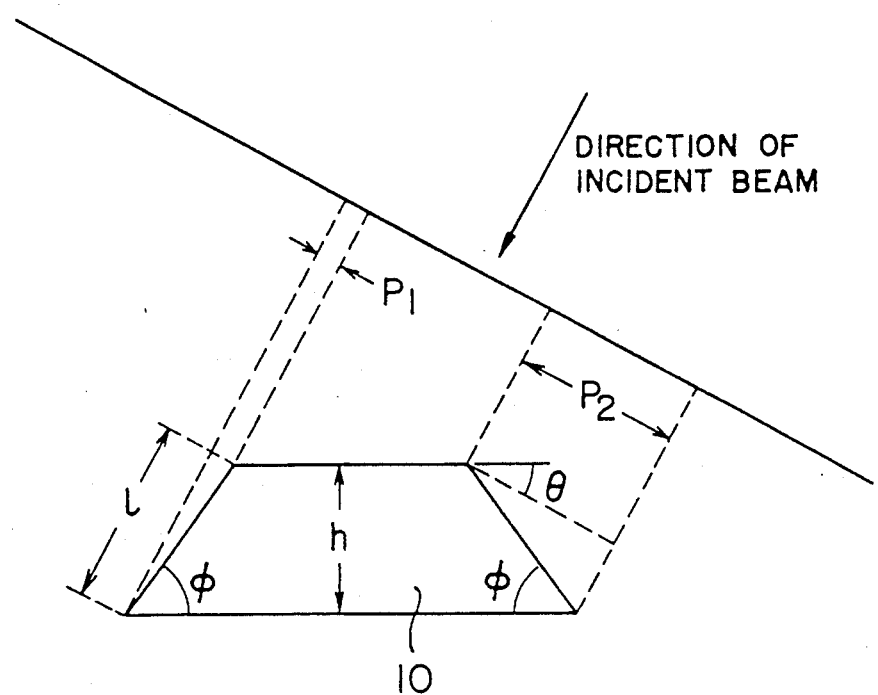
FIG. 4 is a view used for explaining the principle of the pattern configuration measuring apparatus of this invention.

The structure and operation of the apparatus will be described next with reference to FIGS. 2 to 7. First, the column 1a of the SEM 1 is set at a preset inclination angle $\theta$. The value set for the inclination angle $\theta$ greatly influences precision in obtaining fundamental parameters of a three dimensional configuration to be described later, so that a precision of 0.1 degree or better for the value set is required. Next, a specimen 10 is placed on the stage 1d, which is constructed as a rotatable table and the longitudinal direction of taper portions 10a and 10b of the pattern to be measured is made placed parallel to the column inclination plane by rotating the stage 1d (refer to FIG. 2). In such a condition, the taper portions 10a and 10b on opposite sides of the pattern to be measured are observed as being of the same width as shown in FIG. 2. After setting measuring magnification M, deflection control signals for the SEM 1 are sent from image processing unit 2 to the deflector 1b to scan a beam. The deflection control signals include a Horizontal Scan (HS) signal, Vertical Scan (VS) signal, Horizontal Blank (HB) signal, Vertical Blank (VB) and control (CONT) signal. The scanned beam bombards the specimen placed on the stage so that secondary electrons are emitted therefrom. The secondary electrons are detected with the detector 1c and sent as a detection output (secondary electron signal) to image processing unit 2 where the detection output is subjected to A/D conversion and stored in a frame memory having 256 gray levels. The VS signal may use a constant value waveform or a saw-toothed waveform so that a line scan mode or area scan mode is selected. A line profile waveform obtained by scanning the beam is subjected to image processing such as smoothing. Thereafter, the number of pixels between opposite ends of the pattern bottom is obtained and the pattern dimension is calculated with the computer 3. Such a dimension calculating method may be carried out automatically by using a conventionally and widely used threshold method or linear approximation method.

Next, while holding the specimen in position on the stage 1d, the stage 1d is rotated by 90 degrees from the previous set position. The direction of rotating the stage 1d may be optional. The column inclination angle is maintained the same as the previous one. Under such setting conditions, which are different from the previous observation, the taper portions 10a and 10b of the pattern 10 to be measured are observed to have different widths (refer to FIG. 3). The larger width is dependent on the pattern configuration of a concave or convex structure. After setting a measuring magnification M, the deflection control signals for the SEM 1 are sent from image processing unit 2 to the deflector 1b to scan a beam onto the pattern 10 to be measured. Then, secondary electrons emitted from the pattern 10 to be measured are detected with the detector 1c, and sent to image processing unit 2 as a detection output (secondary electron signal). In the former case (where the longitudinal direction of the taper portions of the pattern to be measured is parallel to the column inclination plane), dimension measurement is achieved by obtaining a line profile in the beam scan direction. However, in the latter case (where the longitudinal direction of the taper portions is perpendicular to the column inclination plane), it is necessary to derive a line profile perpendicular to the beam scan direction so that area scanning is performed. The derived line profile perpendicular to the beam scan direction is subjected to image processing similar to the former case and thereafter, the widths $P_1$ and $P_2$ of the taper portions 10a and 10b are obtained. As seen from the relationship shown in FIG. 4, the taper angle $\Phi$ and film thickness (depth) h are given by:

$$P_1 = l \cos(\Phi + \theta) \qquad (1)$$

$$P_2 = l \cos(\Phi - \theta) \qquad (2)$$

$$h = l \sin \Phi \qquad (3)$$

where l represents an actual width of the taper portion. From the equations (1) and (2), the following equation is derived:

$$\frac{\cos(\Phi + \theta)}{\cos(\Phi - \theta)} = \frac{P_1}{P_2} \qquad (4)$$

From the equations (1) and (3), the film thickness h is given by:

$$h = \frac{P_1}{M} \frac{\sin \Phi}{\cos(\Phi + \theta)} \qquad (5)$$

The taper angle $\Phi$ is calculated from the equation (4) using the computer 3, whereas the film thickness (depth) h is calculated from the equation (5) using the calculated taper angle $\Phi$. M is the meaning magnification.

Since an input signal changes with the taper angle $\Phi$, the cross sectional profile A(xi) of the taper portion is approximated by the following equation:

$$A(x_i) = A(x_{j-1}) + \frac{S(x_i)}{\sum_{k=1}^{n} S(x_k)} \cdot h \quad (6)$$

Figure 5:
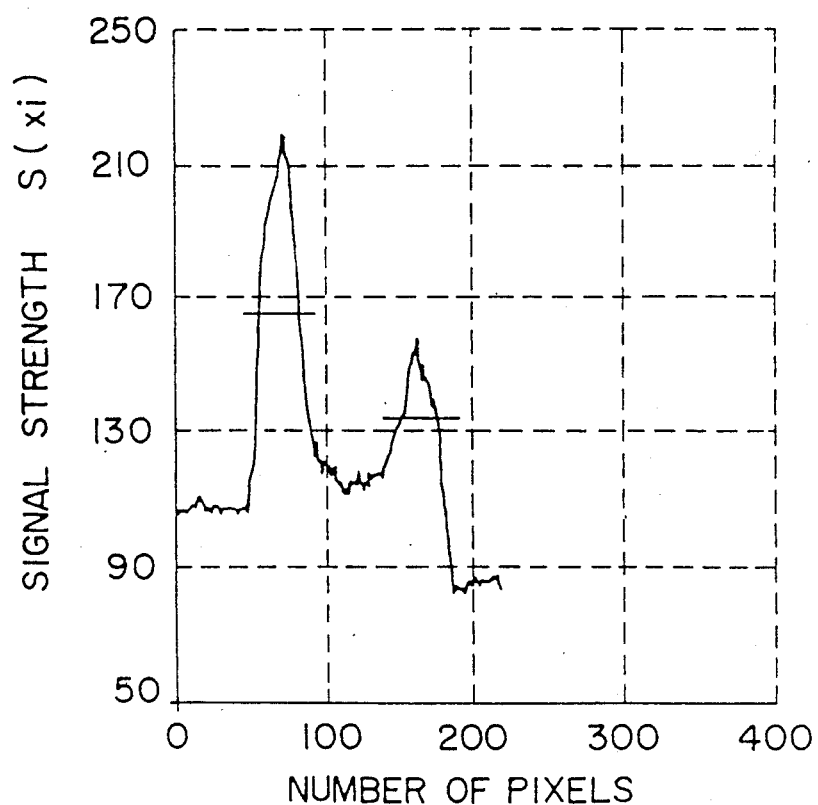
FIG. 5 is a line profile obtained through the observation method shown in FIG. 2.
Figure 6:
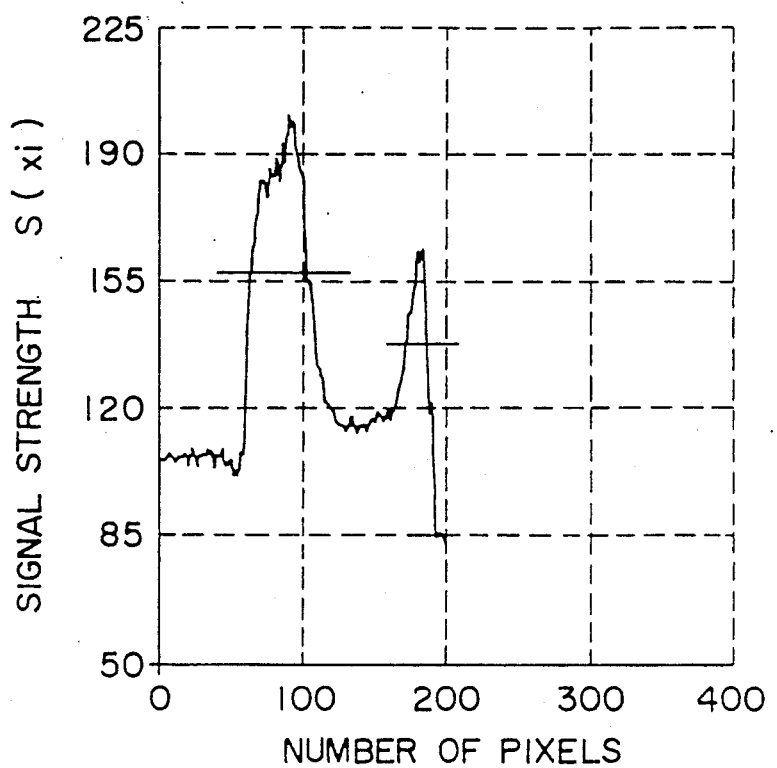
FIG. 6 is a line profile obtained through the observation method shown in FIG. 3.
Figure 7:
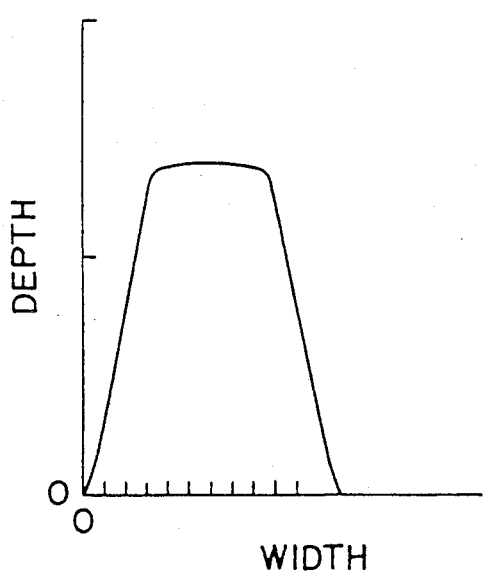
FIG. 7 is a graph showing a pattern profile measured with the pattern configuration measuring apparatus of this invention.

The line profile for the case where the column inclination plane is in parallel with the longitudinal direction of the taper portions 10a and 10b is shown in FIG. 5, whereas the line profile for the case where the column inclination plane is perpendicular to the longitudinal direction of the taper portions 10a and 10b is shown in FIG. 6. The pattern profile measured with the pattern configuration measuring apparatus of this embodiment is shown in FIG. 7. The measuring apparatus of this invention is realized on the assumption that the taper portions 10a and 10b on the opposite sides are symmetrical to each other.

As described so far, according to the present embodiment, a pattern configuration can be measured correctly at high speed in a non-destructive and non-contact manner.

Figure 8:
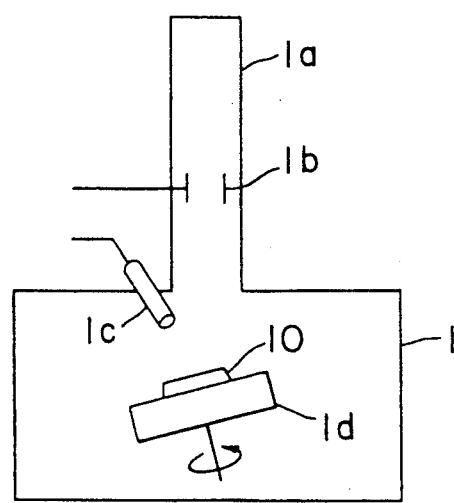
FIG. 8 is a schematic diagram showing a part of another embodiment according to the present invention.

In the above embodiment, the column 1a has been inclined relative to the stage. However, the invention is not limited thereto, and the specimen stage 1b may be inclined while the column 1a is set upright as conventional as shown in FIG. 8. Further, although the convex pattern has been described in the measurement, the invention is also applicable to a concave pattern.

According to the present invention, a pattern configuration can be measured correctly at high speed in a non-destructive and non-contact manner.

What is claimed is:

1. A pattern configuration measuring method for measuring a cross sectional profile of a pattern located on a flat plane surface with said pattern having one of a concave structure and a convex structure and having a taper portion on both sides of said pattern, by scanning a beam in a predetermined direction with a scanning electron microscope, detecting secondary electron emission to acquire an image signal of said pattern, and processing said image signal, comprising the steps of:
    (a) mounting said pattern on said flat plane surface;
    (b) setting a column of said scanning electron microscope and said flat plane surface on which said pattern is mounted at an optimal inclination angle relative to each other;
    (c) positioning said pattern in a first position relative to said column in which said flat plane surface lies in a given plane and in which a beam scan direction of said microscope is perpendicular to a longitudinal direction of said pattern;
    (d) scanning a beam onto said pattern with said scanning electron microscope in a direction perpendicular to said longitudinal direction of said pattern and producing an output signal;
    (e) acquiring said output signal from said scanning in step (d) and image processing said output signal to detect both said taper portions of said pattern and to calculate a dimension of said pattern;
    (f) positioning said pattern in a second position relative to said column in which said flat plane surface lies in said given plane and in which a beam scan direction of said microscope is parallel to said longitudinal direction of said pattern;
    (g) scanning a beam onto said pattern with said scanning electron microscope in a direction parallel to said longitudinal direction of said pattern and producing a second output signal; and
    (h) acquiring said second output signal from said scanning in step (g) and image processing said second output signal to calculate said cross sectional profile of said pattern.

2. A pattern configuration measuring method according to claim 1, in step (b) wherein said column of said scanning electron microscope is fixed, and said pattern to be measured is set at said optional inclination angle relative to said column of said scanning electron microscope.

3. A pattern configuration measuring method according to claim 1, wherein in step (b) said given plane is fixed and said column of said scanning electron microscope is set at said optional inclination angle relative to said given plane.

4. A pattern measuring apparatus for measuring a cross sectional profile of a pattern located on a flat plane surface with said pattern having one of a concave structure and a convex structure and having a taper portion on both sides of said pattern, by scanning a beam in a predetermined direction, detecting secondary electron emission to acquire an image signal of said pattern, and processing said image signal, said pattern measuring apparatus comprising:
    a rotative stage having said flat plane surface for mounting said pattern to be measured and a scanning electron microscope, having a column, mounted at an optional inclination angle relative to each other
    said rotative stage rotating said pattern selectively into a first position in which said flat plane surface lies in a given plane and in which a beam scan direction of said scanning electron microscope is perpendicular to a longitudinal direction of said pattern and into a second position in which said flat plane surface lies in said given plane and in which said beam scan direction of said scanning electron microscope is parallel to said longitudinal direction of said pattern;
    said scanning electron microscope scanning a beam upon said pattern and producing an output signal;
    image processing means for obtaining and image processing said output signal from said scanning electron microscope upon scanning said beam and for producing a processed output; and
    means for calculating a dimension of opposite ends of a bottom of said pattern in accordance with said processed output from said image processing means when said beam scan direction of said scanning electron microscope is perpendicular to said longitudinal direction of said pattern, and, when said beam scan direction of said scanning electron microscope is parallel to said longitudinal direction of said pattern, for calculating said cross sectional profile of said pattern in accordance with said processed output from said image processing means.

5. A pattern measuring apparatus according to claim 4, wherein said column of said scanning electron microscope is fixed, and said pattern to be measured is set at said optional inclination angle relative to said column of said scanning electron microscope.

6. A pattern measuring apparatus according to claim 4, wherein said given plane is fixed, and said column of said scanning electron microscope is set at said optional inclination angle relative to said given plane.

* * * * *